United States Patent Office 3,100,798
Patented Aug. 13, 1963

---

3,100,798
PROCESS FOR PREPARATION OF SUCCINIC ACID
Milton S. Konecky, South Plainfield, N.J., assignor to Esso Research and Engineering Company, a corporation of Delaware
No Drawing. Filed Dec. 27, 1960, Ser. No. 78,259
4 Claims. (Cl. 260—530)

The present invention relates to an improved process for the preparation of succinic acid. More particularly this invention relates to reacting acrolein dimer, i.e. 3,4-dihydro-1,2-pyran-2-carboxaldehyde, with a strong oxidizing agent to obtain succinic acid. Yet more particularly in a preferred embodiment, this invention relates to carrying out said reaction in the presence of an inert solvent. Most particularly in a preferred embodiment this invention relates to utilizing nitric acid as the oxidizing agent and a $C_1-C_3$ monocarboxylic acid as the solvent, separating oxidizing agent and solvent overhead from succinic acid by distillation, and recycling these materials to the reaction zone.

According to the present invention it has now been surprisingly discovered that succinic acid may be economically produced from acrolein dimer. As is well known, succinic acid has a wide market being used in the production of plasticizers, lacquers, dyes, esters for perfumes, etc. Acrolein on the other hand is now cheaply commercially available in large quantities, being produced by the air oxidation of propylene in the presence of suitable catalysts. This commercially available acrolein is cheaply converted to the dimer by merely heating in the presence of a polymerization inhibitor as follows:

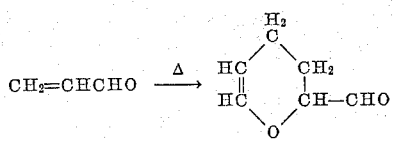

Acrolein dimer may be cheaply prepared for example by heating acrolein in an inert solvent medium such as benzene or other solvent such as an aliphatic hydrocarbon solvent in the presence of a polymerization inhibitor such as quinone or other phenolic polymerization inhibitor at temperatures in the range of 170° C. to 225° C. under pressures to maintain a liquid phase reaction.

According to the present process acrolein dimer is reacted with a standard strong oxidizing agent such as nitric acid, potassium permanganate or chromic acid, in the presence preferably of a diluent, e.g. a $C_1-C_3$ saturated monocarboxylic acid diluent to obtain high yields of succinic acid. The mechanism of the reaction is believed to involve the splitting of the double bond with the formation of carboxyl groups at the double bond carbon atom furthest from the ring oxygen atom and at the carbon atom attached between the oxygen atom of the ring compound and the aldehyde group. Thus, both the aldehyde group and a carbon atom of the ring split out and are eventually converted to carbon dioxide as follows:

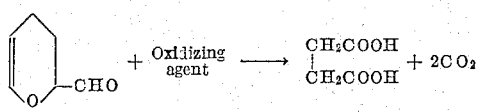

Suitable oxidizing agents are for example:

(1) 2 to 10 wt. percent, preferably 4 to 6 wt. percent, e.g. 5 wt. percent aqueous potassium permanganate,
(2) chromic acid prepared for example by dissolving 2 to 5 wt. percent, preferably 3 to 4 wt. percent, e.g. 3.5 wt. percent of an alkali metal dichromate, e.g. sodium dichromate in 70–100 wt. percent, preferably 90–100 wt. percent, e.g. 95 wt. percent sulfuric acid, and
(3) 30 to 70 wt. percent, preferably 40 to 60 wt. percent, e.g. 50 wt. percent aqueous nitric acid. Preferably aqueous nitric acid is used in the present process.

The amount of the total oxidation agent utilized expressed as weight ratio of oxidizing agent to acrolein dimer may be as follows: for aqueous nitric acid 2/1 to 15/1, preferably 5/1 to 10/1, e.g. 7/1; for chromic acid (based on alkali metal dichromate) 3/1 to 5/1, e.g. 4/1 and for the alkali metal permanganate 5/1 to 10/1 wt. ratio, e.g. 7/1 wt. ratio.

The reaction is carried out at temperatures in the range of 0 to 150° C., preferably 25 to 110° C., e.g. 75° C., for reaction times of ¼ to 10 hours, preferably ½ to 6 hours, e.g. 5 hours.

It is preferred to utilize an inert solvent in the reaction such as a $C_6-C_{10}$ aliphatic paraffin, e.g. normal heptane or a $C_1-C_3$ saturated aliphatic monocarboxylic acid, e.g. acetic acid. Of these solvents the monocarboxylic acids are preferred. The amount of the solvent utilized should be in the range of 0.1/1 to 10/1, preferably 0.5/1 to 2/1, e.g. 1/1 wt. ratio of solvent to acrolein dimer.

Additionally, if aqueous nitric acid is used as the oxidizing agent small amounts of catalyst such as ammonium metavanadate or sodium nitrite may be used to initiate the reaction. The amounts of these catalysts expressed as weight ratio of catalyst to acrolein dimer may be 0.001/1 to 0.1/1, preferably .005/1 to 0.05/1, e.g. .01/1.

Following reaction where aqueous nitric acid is utilized (the preferred procedure) the entire reaction products are passed to a distillation column operating under reduced pressure wherein nitric acid and the solvent if one is utilized are separated overhead and recycled to the process. The remaining unreacted acrolein dimer, byproducts and crude succinic acid are cooled and the crude succinic acid is separated by crystallization and filtration. If desired the crude succinic may be further purified by recrystallization from a suitable solvent such as water or ethanol.

Where potassium permanganate is utilized as the oxidizing agent the crude reaction products are cooled and solid $MnO_2$ is crystallized and removed by filtration. The products are then sent to a distillation column where water is removed under vacuum. A crude succinic acid, byproducts and unreacted acrolein dimer mixture is extracted with ether. The ether extract is then evaporated and crude succinic acid is separated by filtration.

Where chromic acid is utilized as the oxidation agent the crude reaction products are cooled and diluted with ½ to 10 volumes, preferably 1 to 5 volumes, e.g. 2.5 volumes of water based on the amount of total solution utilized. The crude succinic acid which crystallizes from the diluted reaction products is then separated by filtration.

The present invention will be more clearly understood from a consideration of the following examples.

*Example 1*

28 g. of acrolein dimer was suspended in an equal volume of glacial acetic acid and the suspension was added to 380 g. of 50 wt. percent nitric acid at 75 to 80° C., 0.3 g. of ammonium metavanadate was used as a catalyst. Reaction was complete in about 4 hours, the nitric acid and acetic acid were then stripped off under vacuum, and succinic acid 41 mole percent based on the acrolein dimer was separated by crystallization and filtration. The crude succinic acid was found to have a melting point of 159 to 195° C. The crude succinic acid was recrystallized once from hot water. The dried crystals melted sharply at 190° C. (lit.=189–190° C.). The neutralization equivalent of this material was 59.1 (theory=59.05). The nitric acid which was stripped off was found to be suitable for use for additional oxidation runs.

*Example 2*

To 150 g. of 50 wt. percent nitric acid and 0.5 g. of ammonium metavanadate catalyst was added 16.8 g. of acrolein dimer at a temperature of 65–70° C. Reaction was complete at about 2 hours, the nitric acid was then stripped off under vacuum, and about 10 mole percent of succinic acid was separated by crystallization and filtration.

It is to be understood that this invention is not limited to the specific examples, which have been offered merely as illustrations, and that modifications may be made without departing from the spirit of this invention.

What is claimed is:

1. The process for preparing succinic acid which comprises reacting 3,4-dihydro-1,2-pyran-2-carboxaldehyde with a strong oxidizing agent chosen from the group consisting of 20 to 70 wt. percent aqueous nitric acid, 2 to 10 wt. percent aqueous potassium permanganate and chromic acid at temperatures in the range of 0 to 150° C., the amount of oxidizing agent expressed as weight ratio of the nitric acid, potassium permanganate, and chromic acid to 3,4-dihydro-1,2-pyran-2-carboxaldehyde being 2/1 to 15/1, 5/1 to 10/1, and 3/1 to 5/1, respectively.

2. The process for preparing succinic acid which comprises reacting 3,4-dihydro-1,2-pyran-2-carboxaldehyde with 20 to 70 wt. percent aqueous nitric acid at temperatures in the range of 25 to 110° C., the amount of the nitric acid expressed as weight ratio of aqueous nitric acid to 3,4-dihydro 1,2-pyran-2-carboxaldehyde being 5/1 to 10/1.

3. The process of claim 2 in which additionally a catalyst selected from the group consisting of ammonium metavanadate and sodium nitrite in a weight ratio based on 3,4-dihydro-1,2-pyran-2-carboxaldehyde of .005/1 to .05/1 is utilized in the reaction.

4. The process for preparing succinic acid which comprises reacting at temperatures in the range to 25 to 110° C., 3,4-dihydro-1,2-pyran-2-carboxaldehyde with 40 to 60 wt. percent aqueous nitric acid in the presence of a catalyst selected from the group consisting of ammonium metavanadate and sodium nitrite, and in the presence of acetic acid, the weight ratio of these materials to 3,4-dihydro 1,2-pyran-2-carboxaldehyde being for aqueous nitric acid 5/1 to 10/1, for the catalyst .005/1 to 0.05/1 and for acetic acid 0.5/1 to 2/1.

References Cited in the file of this patent

UNITED STATES PATENTS

| | | |
|---|---|---|
| 2,312,468 | Ebel et al. | Mar. 2, 1943 |
| 2,670,370 | Toland | Feb. 23, 1954 |
| 2,676,186 | Dunlap et al. | Apr. 20, 1954 |